US009284856B2

(12) United States Patent
Iijima et al.

(10) Patent No.: US 9,284,856 B2
(45) Date of Patent: Mar. 15, 2016

(54) GAS TURBINE COMBINED CYCLE POWER PLANT WITH DISTILLATION UNIT TO DISTILL A LIGHT OIL FRACTION

(75) Inventors: Masaki Iijima, Tokyo (JP); Toyoaki Komori, Tokyo (JP); Ryotaro Kanai, Tokyo (JP); Takeo Araki, Yokohama (JP)

(73) Assignee: MITSUBISHI HITACHI POWER SYSTEMS, LTD., Yokohama-shi (JP)

( * ) Notice: Subject to any disclaimer, the term of this patent is extended or adjusted under 35 U.S.C. 154(b) by 1032 days.

(21) Appl. No.: 13/496,904

(22) PCT Filed: Dec. 18, 2009

(86) PCT No.: PCT/JP2009/007029
§ 371 (c)(1),
(2), (4) Date: Mar. 19, 2012

(87) PCT Pub. No.: WO2011/074048
PCT Pub. Date: Jun. 23, 2011

(65) Prior Publication Data
US 2012/0175889 A1 Jul. 12, 2012

(51) Int. Cl.
*F01K 23/10* (2006.01)
*F01K 23/06* (2006.01)
(Continued)

(52) U.S. Cl.
CPC . *F01K 23/10* (2013.01); *B01D 3/10* (2013.01); *C10G 7/06* (2013.01); *F01K 7/16* (2013.01); *F01K 23/064* (2013.01); *Y02E 20/16* (2013.01)

(58) Field of Classification Search
CPC ......... Y02E 20/16; Y02E 20/20; Y02E 20/18; F02C 6/00; F02C 6/18; F02C 3/20; H02K 7/18; F01K 23/106; F01K 23/064; C10G 7/00–7/12; B01D 3/10–3/108; B01D 2311/2669

USPC ............ 60/39.182, 39.5, 320, 783, 784, 801; 202/110, 106; 208/92–94, 347, 354; 203/87, 39
See application file for complete search history.

(56) References Cited

U.S. PATENT DOCUMENTS 3,110,663 A * 11/1963 Miller .............................. 208/93
4,292,140 A * 9/1981 Kawasaki et al. ............... 203/22
(Continued)

FOREIGN PATENT DOCUMENTS

JP 9-317407 A 12/1997
JP 11-247669 A 9/1999
(Continued)

OTHER PUBLICATIONS

International Search Report of PCT/JP2009/007029, mailing date of Feb. 16, 2010.
(Continued)

*Primary Examiner* — Phutthiwat Wongwian
*Assistant Examiner* — Alain Chau
(74) *Attorney, Agent, or Firm* — Westerman, Hattori, Daniels & Adrian, LLP (57) ABSTRACT

The present invention is a gas turbine combined cycle power plant which generates electricity by fueling a gas turbine with crude oil or heavy oil and which is provided with a vacuum distillation unit which distills and extracts a light oil fraction from crude oil or heavy oil by keeping the interior thereof in an environment which lowers a boiling point of crude oil or heavy oil, and the vacuum distillation unit is provided with heaters which heat distillation materials by using low pressure steam and medium pressure steam generated in a gas turbine combined cycle.

16 Claims, 5 Drawing Sheets

(51) Int. Cl.
  *C10G 7/06* (2006.01)
  *B01D 3/10* (2006.01)
  *F01K 7/16* (2006.01)

(56) References Cited

U.S. PATENT DOCUMENTS

| | | | | |
|---|---|---|---|---|
| 4,447,318 A | * | 5/1984 | Ogura | C10G 7/08 203/25 |
| 5,238,540 A | * | 8/1993 | Skatulla | C10G 7/08 203/25 |
| 5,252,200 A | * | 10/1993 | Skatulla | C07C 7/08 208/313 |
| 6,298,651 B1 | * | 10/2001 | Iijima | F01K 23/064 60/780 |
| 6,381,943 B1 | * | 5/2002 | Iijima et al. | 60/783 |
| 6,786,050 B1 | * | 9/2004 | Okada | C10G 45/00 60/39.12 |
| 2006/0057059 A1 | * | 3/2006 | Nishida et al. | 423/648.1 |
| 2011/0289897 A1 | * | 12/2011 | Fujita | F01K 23/064 60/39.12 |

FOREIGN PATENT DOCUMENTS

| | | |
|---|---|---|
| JP | 2000-80905 A | 3/2000 |
| JP | 2001-73715 A | 3/2001 |
| KR | 1999-0067952 A | 8/1999 |

OTHER PUBLICATIONS

Written Opinion of the International Searching Authority of PCT/JP2009/007029, mailing date of Feb. 16, 2010.

Korean Notice of Allowance dated Aug. 29, 2013, issued in corresponding Korean Patent Application No. 10-2012-7007954, w/ English translation.

* cited by examiner

Prior Art

GAS TURBINE COMBINED CYCLE POWER PLANT WITH DISTILLATION UNIT TO DISTILL A LIGHT OIL FRACTION

TECHNICAL FIELD

The present invention relates to a gas turbine combined cycle power plant which has a gas turbine fuel production system for separating crude oil into a light oil fraction and a heavy oil fraction to fuel a gas turbine with the light oil fraction and also to technology for generating electricity by enhancing the efficiency of electricity generation in a power station as a whole including fuel processing.

BACKGROUND ART

Conventionally, the gas turbine combined cycle disclosed in Patent Document 1 as technology applicable to the combined cycle of this type is known.

The gas turbine combined cycle disclosed in Patent Document 1 is that which drives a gas turbine by using combustion gas obtained through the combustion of a fuel together with high pressure air and also drives a steam turbine by using steam generated by exhaust gas from the gas turbine, thereby generating electricity and others by utilizing the output of the gas turbine and the steam turbine.

On the other hand, technology has been proposed as disclosed in Patent Document 2 as a gas turbine fuel production system supplies a light fuel oil to a gas turbine of a gas turbine combined cycle. The fuel supplying system of Patent Document 2 is that which heats crude oil or heavy oil by using steam obtained from a boiler of the gas turbine combined cycle, thereafter, distills crude oil or heavy oil under reduced pressure and uses the thus obtained light oil fraction as a fuel of the gas turbine and uses the thus obtained heavy oil fraction as a fuel of the boiler.

PRIOR ART DOCUMENT

Patent Document

Patent Document 1: Japanese Published Unexamined Patent Application Publication No. 11-247669
Patent Document 2: Japanese Published Unexamined Patent Application Publication No. 2001-73715

SUMMARY OF THE INVENTION

Problem to be Solved by the Invention

Figure 5:
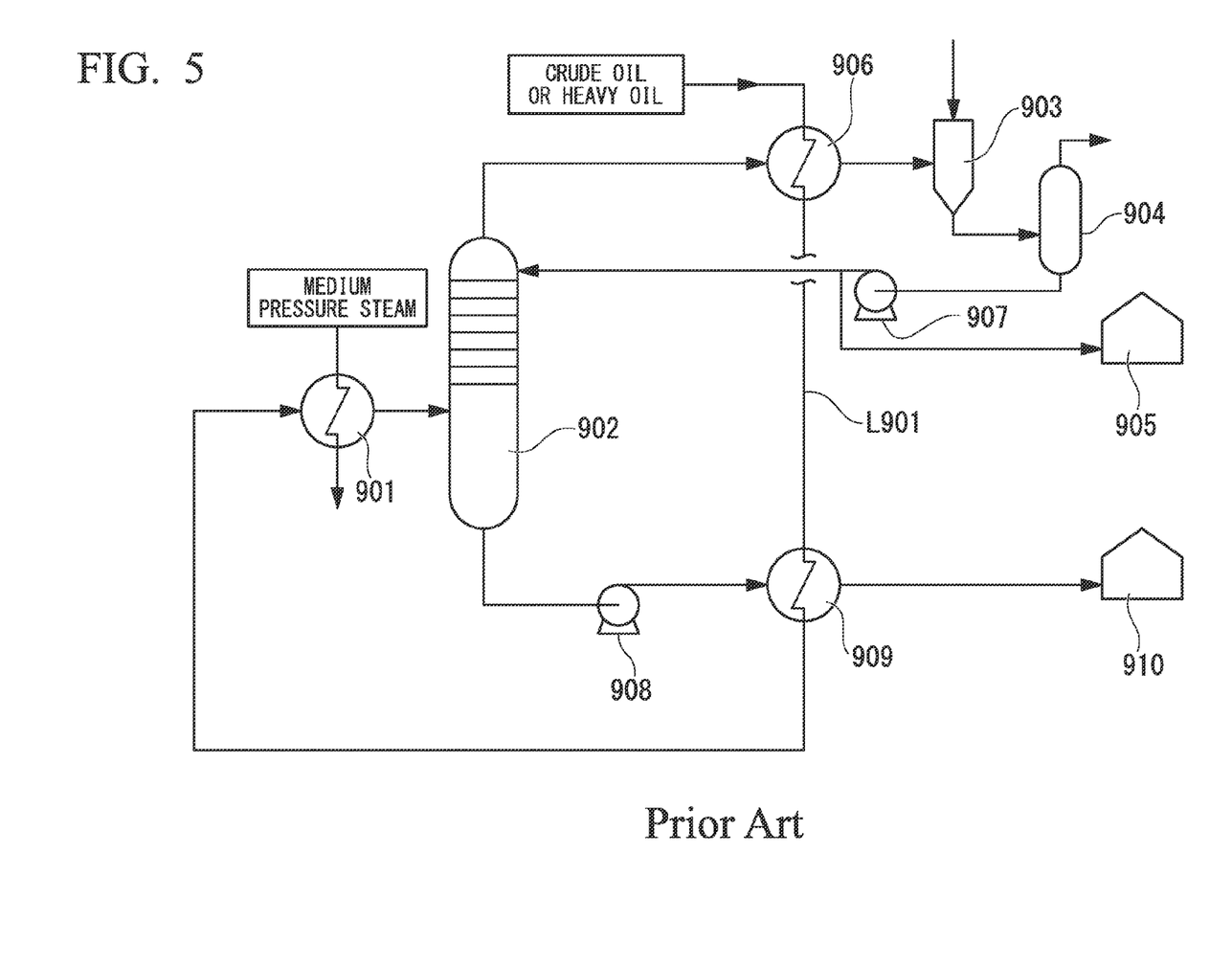
FIG. 5 is a flowchart which shows a gas turbine fuel production system in a conventional gas turbine combined cycle power plant.

Incidentally, as shown in FIG. 5 which covered by Patent Document 2, on distillation under reduced pressure, medium pressure steam extracted from a gas turbine combined cycle is used to heat crude oil or heavy oil. That is, in FIG. 5, the reference numeral 901 denotes a heater which heats crude oil or heavy oil which flows into a vacuum distillation unit 902 by way of a supply line L901 by using the medium pressure steam, and the reference numeral 903 denotes a steam ejector which suctions a gas inside the vacuum distillation unit 902 by using a high-speed steam flow and feeds the gas into a separation tank 904. A liquid component separated by the separation tank 904 and remaining at the bottom thereof is partially fed to a storage tank 905 and partially circulated again by a pump 907 up to an upper part of the vacuum distillation unit 902. Further, a gas component separated by the separation tank 904 is taken out from the upper part. There is installed between the vacuum distillation unit 902 and the steam ejector 903 a heat exchanger 906 for heating crude oil or heavy oil by using the medium pressure steam. On the other hand, a heavy oil fraction at the bottom of the vacuum distillation unit 902 is fed by a pump 908 by way of a heat exchanger 909 to a storage tank 910 of the heavy oil fraction. However, this gas turbine fuel production process has been required for further improvement to enhance the operating efficiency of the gas turbine combined cycle by using more efficiently medium pressure steam which can be effectively used for the generation of electricity.

The present invention has been made in view of the above situation, an object of which is to provide a gas turbine combined cycle power plant which is capable of decreasing the consumption of medium pressure steam to enhance the overall efficiency of a gas turbine combined cycle and a gas turbine fuel production system, as compared with a single-stage heating system by using medium pressure steam.

Means for Solving the Problem

In order to attain the above object, the present invention has proposed the following means.

The present invention is a gas turbine combined cycle power plant which generates electricity by fueling a gas turbine with crude oil or heavy oil and also using exhaust gas of the gas turbine as at least a partial heat source of a steam turbine. The present invention is provided with a vacuum distillation unit which distills a light oil fraction from crude oil or heavy oil, with the interior thereof kept in an environment which lowers a boiling point of crude oil or heavy oil, and the vacuum distillation unit is provided with heaters for heating crude oil or heavy oil by using low pressure steam and medium pressure steam generated in a gas turbine combined cycle. Further, the present invention is a method for generating electricity by a gas turbine combined cycle in which a gas turbine is fueled with crude oil or heavy oil and exhaust gas of the gas turbine is also used as at least a partial heat source of a steam turbine. When a light oil fraction is distilled from crude oil or heavy oil in an environment which lowers a boiling point of crude oil or heavy oil, the crude oil or the heavy oil is heated by using low pressure steam and medium pressure steam generated in the gas turbine combined cycle.

Then, in the above-constituted present invention, the heaters for heating distillation materials by using low pressure steam and medium pressure steam generated in the gas turbine combined cycle are installed on the vacuum distillation unit. Therefore, as compared with a single-stage heating system by using medium pressure steam, the vacuum distillation unit consumes the medium pressure steam in a decreased amount, while the gas turbine combined cycle uses the medium pressure steam at an increased rate. As a result, it is possible to enhance the overall efficiency of the gas turbine combined cycle and the gas turbine fuel production system.

Further, in the present invention, the heaters into which the low pressure steam and the medium pressure steam are introduced are installed at different locations of the vacuum distillation unit.

Then, in the above-constituted present invention, the heaters into which the low pressure steam and the medium pressure steam are introduced are installed at different sites of the vacuum distillation unit. Therefore, these heaters can be used depending on intended applications. To be more specific, the heater into which the low pressure steam is introduced can be used to heat crude oil or heavy oil (a distillation material) supplied to the vacuum distillation unit, and also the heater into which the medium pressure steam is introduced can be used to heat intermediate fractions (distillation materials) extracted from an intermediate stage of the vacuum distillation unit.

Further, in the present invention, the heater into which the low pressure steam is introduced or the heater into which the medium pressure steam is introduced is installed halfway along a supply channel which supplies crude oil or heavy oil to the vacuum distillation unit, thereby heating crude oil or heavy oil.

Then, in the above-constituted present invention, the heater into which the low pressure steam is introduced or the heater into which the medium pressure steam is introduced is used to preheat crude oil or heavy oil supplied to the vacuum distillation unit. Thereby, it is possible to distill efficiently crude oil or heavy oil inside the vacuum distillation unit and enhance the distillation efficiency in the vacuum distillation unit.

Further, in the present invention, the heater into which the medium pressure steam is introduced is installed at a circulation channel which heats intermediate fractions extracted from the intermediate stage of the vacuum distillation unit and returns them inside the vacuum distillation unit.

Then, in the above-constituted present invention, the heater into which the medium pressure steam is introduced is used to heat the intermediate fractions extracted from the intermediate stage of the vacuum distillation unit, thus making it possible to enhance the distillation efficiency in the vacuum distillation unit.

Further, in the present invention, the heater into which the medium pressure steam is introduced is used to heat an intermediate fraction extraction pipe and the heater into which the low pressure steam is introduced is used to heat a fuel supply line, and the intermediate fraction extraction pipe is installed below the fuel supply line.

Then, in the above-constituted present invention, the intermediate fraction extraction pipe heated by the heater into which the medium pressure steam is introduced is installed below the fuel supply line heated by the heater into which the low pressure steam is introduced. Thereby, during downward movement of the heated crude oil or the heated heavy oil inside the vacuum distillation unit, it is possible to extract efficiently a light oil fraction contained therein.

Further, in the present invention, the low pressure steam and the medium pressure steam are subjected to extracting from a multiple-stage exhaust heat recovery portion of the gas turbine in the gas turbine combined cycle.

Then, in the above-constituted present invention, the low pressure steam and the medium pressure steam extracted from the multiple-stage exhaust heat recovery portion of the gas turbine in the gas turbine combined cycle, thus making it possible to effectively use the low pressure steam together with the medium pressure steam.

Still further, in the present invention, the low pressure steam and the medium pressure steam extracted from the middle of the steam turbine in the gas turbine combined cycle.

Then, in the above-constituted present invention, the low pressure steam and the medium pressure steam extracted from the middle of the steam turbine in the gas turbine combined cycle, thus making it possible to effectively use the low pressure steam together with the medium pressure steam.

Advantageous Effect of the Invention

According to the present invention, the low pressure steam and the medium pressure steam generated at the gas turbine combined cycle are used to heat crude oil or heavy oil. Therefore, as compared with a single-stage heating system which uses medium pressure steam, the medium pressure steam used for producing a fuel of the gas turbine from crude oil or heavy oil in the vacuum distillation unit is decreased, while the medium pressure steam used for driving the steam turbine of the gas turbine combined cycle is used with an increased rate. As a result, it is possible to enhance the overall efficiency of the gas turbine combined cycle and the gas turbine fuel production system.

MODE FOR CARRYING OUT THE INVENTION

An explanation will be given for one embodiment of the present invention by referring to FIG. 1 to FIG. 3.

Figure 1:
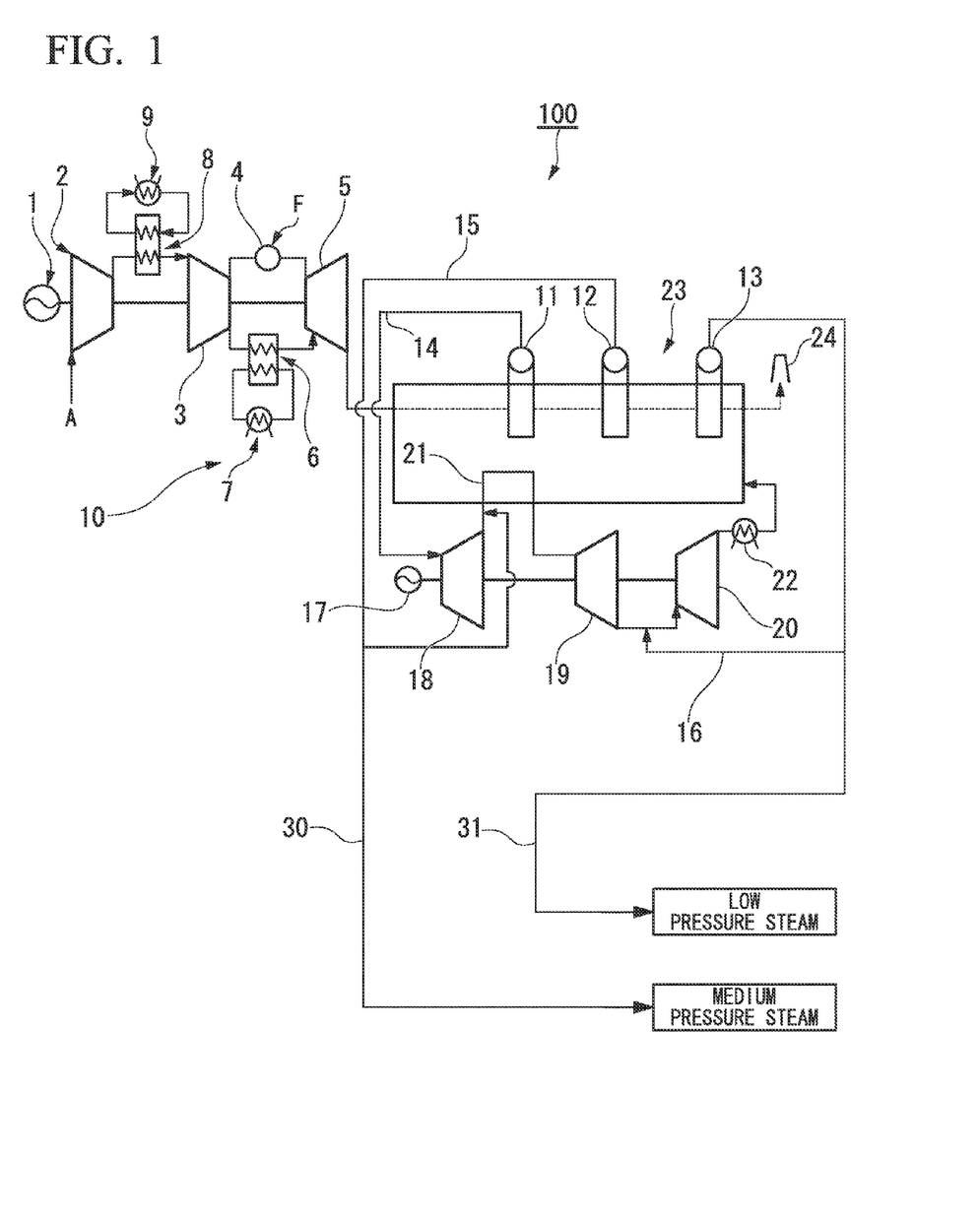
FIG. 1 is a flowchart which shows a gas turbine combined cycle 100 which is an electricity generation part of the gas turbine combined cycle power plant in the present invention.

FIG. 1 is a flowchart which shows the gas turbine combined cycle 100 which is an electricity generation part of the gas turbine combined cycle power plant in the present invention.

The gas turbine combined cycle 100 is composed of a gas turbine portion 10 which is constituted with an electric generator 1, a low pressure compressor 2, a high pressure compressor 3, a combustor 4, a gas turbine 5, a rotor cooling air cooler 6, cooling towers 7, 9 and an intercooler 8 as well as a multiple-stage exhaust heat recovery portion 23 which is constituted with a high pressure steam generator 11, a medium pressure steam generator 12, a low pressure steam generator 13, a high pressure steam piping 14, a medium pressure steam piping 15, a low pressure steam piping 16, an electric generator 17, a high pressure steam turbine 18, a medium pressure steam turbine 19, a low pressure steam turbine 20, a reheater 21 and a condenser 22.

The high pressure compressor 3, the low pressure compressor 2 and the electric generator 1 are coaxially coupled to the gas turbine 5 of the gas turbine portion 10. As will be described later, the gas turbine 5 driven by combustion gas is used to actuate them, thereby making atmosphere air into air of a predetermined high pressure and also generating electricity. First, the atmosphere air A is drawn in from a suction port of the low pressure compressor 2 driven by the gas turbine 5 and subjected to adiabatic compression. Then, high-temperature compressed air which has been pressurized up to a predetermined pressure is discharged from a discharge port of the low pressure compressor 2.

When the high temperature compressed air is introduced, as it is, into the high pressure compressor 3 and pressurized, the high pressure compressor 3 is increased in driving force necessary for pressurization. Thereby, the driving force supplied from the gas turbine 5 is increased for driving the high pressure compressor 3 and the driving force for driving the electric generator 1 is decreased. The intercooler 8 is, therefore, installed between the discharge port of the low pressure compressor 2 and a suction port of the high pressure compressor 3, by which compressed air discharged from the low pressure compressor 2 is cooled and introduced into the high pressure compressor 3.

High pressure air which has been pressurized by the high pressure compressor 3 is discharged into the combustor 4 and mixed with a fuel F which has been similarly introduced into the combustor 4, then, combusted to give high-temperature high pressure combustion gas, thereby driving the gas turbine 5 as described above. Further, a part of the high pressure air discharged from the high pressure compressor 3 or the high pressure air extracted from the intermediate stage of the high pressure compressor 3 is cooled by the rotor cooling air cooler 6, supplied through the rotor of the gas turbine 5 into moving blades or stationary blades of the gas turbine 5 exposed to the high-temperature combustion gas, thereby cooling these blades from inside. Still further, the high-temperature exhaust gas which drives the gas turbine 5 and is discharged from gas turbine 5 is released from a chimney 2 into the atmosphere air by way of the multiple-stage exhaust heat recovery portion 23.

Then, in the multiple-stage exhaust heat recovery portion 23, exhaust gas from the gas turbine 5 is allowed to pass sequentially through the high pressure steam generator 11, the medium pressure steam generator 12 and the low pressure steam generator 13, thereby recovering the heat contained in the exhaust gas. Thus, high pressure steam, medium pressure steam and low pressure steam are generated and sent by the high pressure steam piping 14, the medium pressure steam piping 15 and the low pressure steam piping 16 respectively to the high pressure steam turbine 18, the medium pressure steam turbine 19 and the low pressure steam turbine 20, each of which is coupled coaxially. The steam is expanded inside the steam turbines to rotate these steam turbines. The electric generator 17 coupled coaxially with the steam turbines is driven by the output of the steam turbines to generate electric energy.

Further, at an outlet of the high pressure steam turbine 18, exhaust gas which has driven the high pressure steam turbine 18 is mixed with the medium pressure steam which has been generated at the medium pressure steam generator 12 and supplied by the medium pressure steam piping 15. Thereafter, the resultant is heated by the reheater 21 to increase inlet temperatures of the medium pressure steam turbine 19, thereby increasing the output of the medium pressure steam turbine 19. Further, at an outlet of the medium pressure steam turbine 19, exhaust gas which has driven the medium pressure steam turbine 19 is mixed with the low pressure steam which has been generated by the low pressure steam generator 13 and supplied by the low pressure steam piping 16 and, thereafter, the resultant is supplied to the low pressure steam turbine 20.

Further, at an outlet of the low pressure steam turbine 20, exhaust gas from the low pressure steam turbine 20 is subjected to condensation by the condenser 22 to provide condensed water. Then, the condensed water is supplied to the high pressure steam generator 11, the medium pressure steam generator 12 and the low pressure steam generator 13 respectively.

Then, in the multiple-stage exhaust heat recovery portion 23 of the above-constituted gas turbine combined cycle 100, a medium pressure steam extraction pipe 30 is connected halfway along the medium pressure steam piping 15 for supplying the medium pressure steam from the medium pressure steam generator 12 to the medium pressure steam turbine 19. Also, a low pressure steam extraction pipe 31 is connected halfway along the low pressure steam piping 16 for supplying low pressure steam from the low pressure steam generator 13 to the low pressure steam turbine 20.

Figure 2:
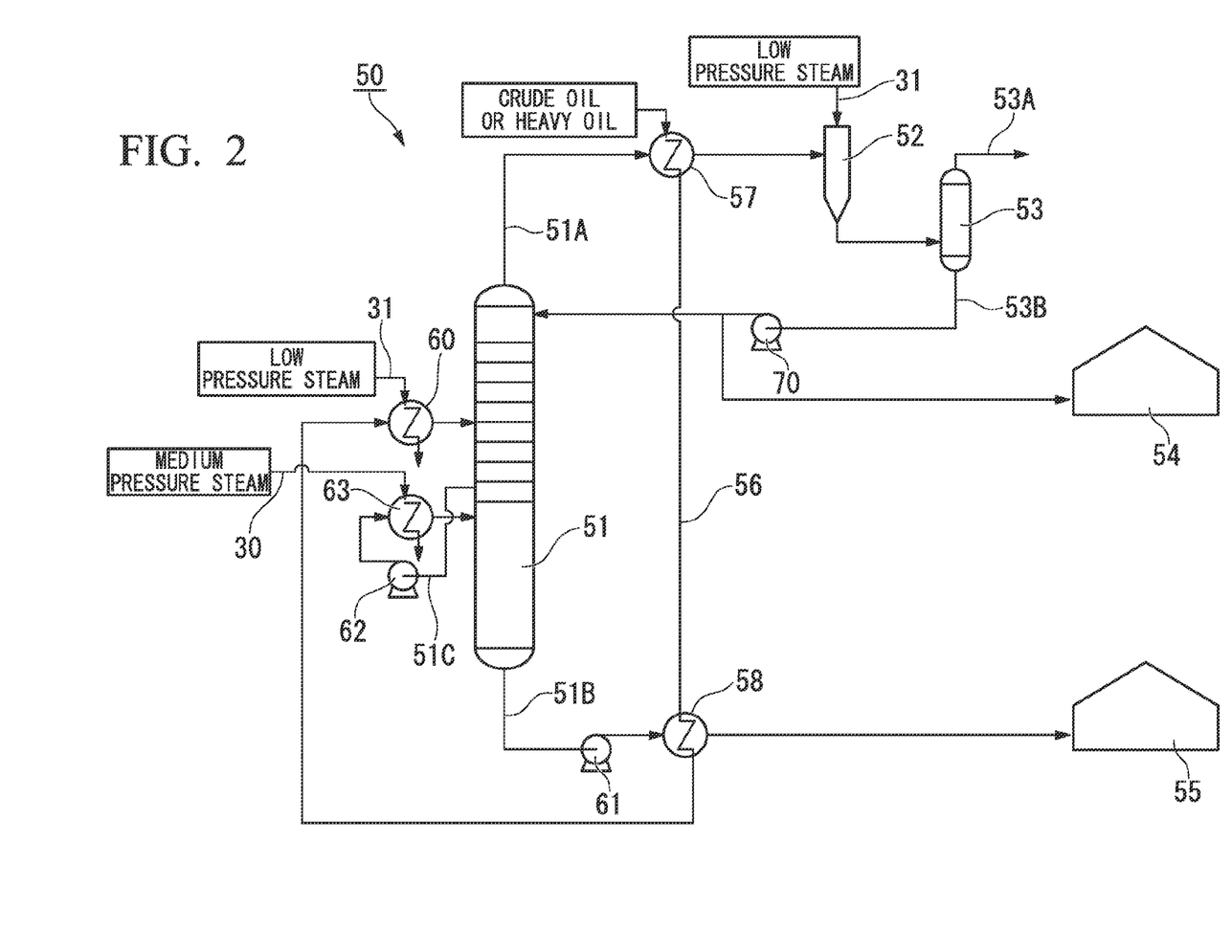
FIG. 2 is a flowchart which shows a gas turbine fuel production system 50 in the gas turbine combined cycle power plant of the present invention.
Figure 3:
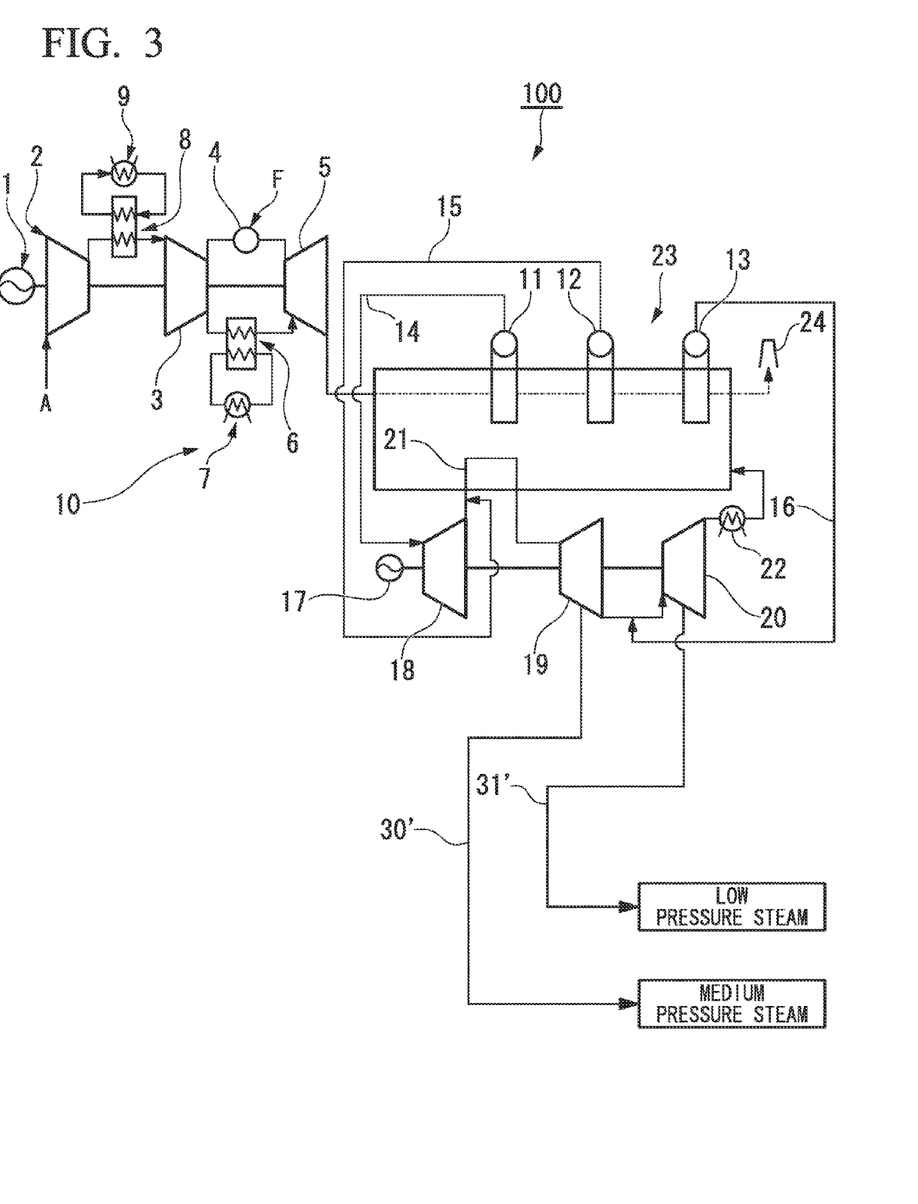
FIG. 3 is a flowchart which shows another mode of the gas turbine combined cycle 100 shown in FIG. 1.

The medium pressure steam extraction pipe 30 and the low pressure steam extraction pipe 31 are connected to a gas turbine fuel production system 50 which supplies a light fuel oil to the combustor 4 of the gas turbine combined cycle 100 (refer to FIG. 2).

Next, an explanation will be given by referring to FIG. 2 for the gas turbine fuel production system 50 in the gas turbine combined cycle power plant according to the embodiment of the present invention.

The gas turbine fuel production system 50 is mainly constituted with a vacuum distillation unit 51, a steam ejector 52, a separator 53, a light oil fraction storage tank 54, and a heavy oil fraction storage tank 55.

The vacuum distillation unit 51 is an installation for distilling crude oil or heavy oil under reduced pressure. A fuel supply line 56 for supplying crude oil or heavy oil is connected to an upper part of the vacuum distillation unit from than the center thereof, and two heat exchangers 57, 58 and a low pressure steam heater 60 for heating crude oil or heavy oil are installed halfway along the fuel supply line 56.

Low pressure steam having a pressure of about 0.47 MPa and a temperature of about 210° C. is supplied to the low pressure steam heater 60 through the low pressure steam extraction pipe 31 continuing from the gas turbine combined cycle 100. Heat is exchanged between the low pressure steam and crude oil or heavy oil supplied through the fuel supply line 56, thereby crude oil or heavy oil is heated.

Further, the vacuum distillation unit 51 is in general provided with a multiple-stage tray in which a light oil fraction extraction pipe 51A is connected to the upper end thereof and a heavy oil fraction extraction pipe 51B is connected to the lower end thereof.

Still further, the steam ejector 52 has a structure in which low pressure steam is supplied through the low pressure steam extraction pipe 31 from the gas turbine combined cycle 100. The low pressure steam is used to conduct suctioning inside the vacuum distillation unit 51 through the light oil fraction extraction pipe 51A.

Then, in the above-constituted vacuum distillation unit 51, steam is allowed to flow at a high speed by the steam ejector 52 located downstream through the low pressure steam extraction pipe 31 continuing from the gas turbine combined cycle 100. Thereby, a gas inside the vacuum distillation unit 51 is suctioned by way of the light oil fraction extraction pipe 51A and the vacuum distillation unit 51 is reduced in pressure lower than atmospheric pressure. In the vacuum distillation unit 51 which is reduced in pressure, as described above, by suction operations of the steam ejector 52, a light oil fraction will undergo efficient evaporation even at a temperature of about 200° C. under reduced internal pressure (50 mmHg). Also, the light oil fraction and a heavy oil fraction are moved and separated respectively above and below.

Then, the heavy oil fraction separated by the vacuum distillation unit 51 is supplied to the heavy oil fraction storage tank 55 through the heavy oil fraction extraction pipe 51B and by a pump 61 installed halfway along the heavy oil fraction extraction pipe 51B. Further, the previously-described heat exchangers 57, 58 are installed halfway along the light oil fraction extraction pipe 51A and the heavy oil fraction extraction pipe 51B, thereby transmitting heat contained in the light oil fraction and the heavy oil fraction to crude oil or heavy oil supplied through the fuel supply line 56.

Further, an intermediate fraction extraction pipe 51C for extracting intermediate fractions inside the vacuum distillation unit 51 is installed at the intermediate stage of the vacuum distillation unit 51 and below the fuel supply line 56. The intermediate fraction extraction pipe 51C is provided with a pump 62 for transferring the intermediate fractions and a medium pressure steam heater 63 for heating the intermediate fractions in midstream thereof. Medium pressure steam having a pressure of about 1.8 MPa and a temperature of about 310° C. is supplied to the medium pressure steam heater 63 through the medium pressure steam extraction pipe 30 continuing from the gas turbine combined cycle 100. Also, the medium pressure steam heater 63 exchanges heat between the medium pressure steam and intermediate fractions supplied through the intermediate fraction extraction pipe 51C, thereby more efficiently extracting a light oil fraction from the intermediate fractions.

Further, A separator 53 for separating a gas component and a liquid component of the light oil fraction supplied from the vacuum distillation unit 51 is installed at the down stream of the steam ejector 52.

The separator 53 is connected at an upper part thereof with a gas exhaust pipe 53A and connected at a lower part thereof with a liquid component transporting pipe 53B. The gas component in the light oil fraction separated is exhausted through the gas exhaust pipe 53A, and the liquid component in the remaining light oil fraction (a practical light oil fraction) is transferred through the liquid component transporting pipe 53B. Further, a pump 70 is installed halfway along the liquid component transporting pipe 53B, and the light oil fraction is drawn out from the bottom of the separator 53 by the pump 70, part of which is circulated again up to an upper part of the vacuum distillation unit 51 and the remaining part of which is stored at the light oil fraction storage tank 54.

Low pressure steam extracted from the low pressure steam heater 60 or medium pressure steam extracted from the medium pressure steam heater 63 is subjected to condensation and supplied to the condenser 22 of the gas turbine combined cycle 100.

Next, an explanation will be given for operation of the gas turbine fuel production system 50 shown in FIG. 2.

Crude oil or heavy oil which is supplied as a fuel to a power station is supplied to the vacuum distillation unit 51 through the low pressure steam heater 60 by way of the fuel supply line 56. As described previously, the low pressure steam having a pressure of about 0.4 MPa and temperatures of about 200 to 230° C. is supplied to the low pressure steam heater 60 through the low pressure steam extraction pipe 31 continuing from the gas turbine combined cycle 100. Also, heat is exchanged between the low pressure steam and crude oil or heavy oil supplied through the fuel supply line 56, thereby crude oil or heavy oil is preheated.

In the vacuum distillation unit 51, the light oil fraction evaporates, and the light oil fraction is separated above while the heavy oil fraction is separated below. At this time, the intermediate fraction extraction pipe 51C which extracts intermediate fractions in the vacuum distillation unit 51 is heated by the medium pressure steam heater 63 to which the medium pressure steam different from the low pressure steam is supplied. Then, the medium pressure steam heater 63 is used to conduct heat exchange between the medium pressure steam and the intermediate fractions which are extracted through the intermediate fraction extraction pipe 51C. Thereby, the light oil fraction is extracted from the intermediate fractions more efficiently. That is, crude oil or heavy oil supplied through the fuel supply line 56 is heated by the low pressure steam and the intermediate fractions which are decreased in temperature by distillation under reduced pressure inside the vacuum distillation unit 51 and supplied through the intermediate fraction extraction pipe 51C is also heated by the medium pressure steam. Thereby, the medium pressure steam consumed in the vacuum distillation unit 51 is decreased relatively as a whole, thus resulting in increased usage of the medium pressure steam in the gas turbine combined cycle 100. That is, as compared with the conventional system shown in FIG. 5, it is possible to enhance the overall efficiency of the gas turbine combined cycle 100 and the gas turbine fuel production system 50 as shown in Table 1.

TABLE 1

| | Estimation of crude oil distillation under reduced pressure | |
|---|---|---|
| FIGURE | FIG. 2 (Present invention) | FIG. 5 (Prior art) |
| Method | Heating by medium pressure steam, heating by low pressure steam Vacuum distillation unit-specific position | Heating by medium pressure steam (Supply of crude oil, heating of heavy oil) |
| Conditions of heating steam | Medium pressure steam: 18 kg/cm$^2$ A, 308° C. Low pressure steam: 4.7 kg/cm$^2$ A, 209° C. | Medium pressure steam: 18 kg/cm$^2$ A, 308° C. |
| Amount of crude oil supplied | 45,000 barrels/day | 45,000 barrels/day |
| Caloric amount to crude oil heater | Medium pressure steam heater: 11.7 10$^6$ kcal/h Low pressure steam heater: 12.4 10$^6$ kcal/h | Medium pressure steam heater: 24.1 10$^6$ kcal/h |
| Steam consumption | Medium pressure steam: 22.6 t/h Low pressure steam: 23.1 t/h | Medium pressure steam: 46.5 t/h |
| Reduction in output of electricity generation in association with extracting steam | 5,250 kW | 6,380 kW |
| Reduction rate of output of electricity generation | 0.85% | 1.03% |

On the other hand, the light oil fraction extracted by the vacuum distillation unit 51 is transferred to the separator 53 in a state of being suctioned by the steam ejector 52 and separated into a gas component and a liquid component by the separator 53. The liquid component is a light oil fraction (a practical light oil fraction) and drawn out from the bottom of the separator 53 by the pump 70. The liquid component is partially circulated again up to an upper part of the vacuum distillation unit 51, with and the remaining portion thereof is stored at the light oil fraction storage tank 54. The gas component is taken out from an upper part of the separator 53. While the light oil fraction is suctioned out by the steam ejector 52, heat is exchanged between the light oil fraction and crude oil or heavy oil, and the crude oil or the heavy oil is heated by way of the heat exchanger 57.

On the other hand, the heavy oil fraction drawn out by the pump 61 from the bottom of the vacuum distillation unit 51 is stored in the heavy oil fraction storage tank 55 by way of the heat exchanger 58. The heavy oil fraction drawn out by the pump 61 is subjected to heat exchange with crude oil or heavy oil by way of the heat exchanger 58, thereby crude oil or heavy oil is heated.

As described above in detail, according to the embodiment of the gas turbine combined cycle power plant of the present invention, the vacuum distillation unit 51 is provided with the heaters 60, 63 which heat distillation materials (a fuel like crude oil or heavy oil and intermediate fractions on distillation) inside the gas turbine fuel production system 50 by using low pressure steam and medium pressure steam generated in the gas turbine combined cycle 100. Therefore, as compared with a single-stage heating system by using medium pressure steam, the consumption of the medium pressure steam is decreased in the vacuum distillation unit 51 but increased in the gas turbine combined cycle 100. As a result, it is possible to enhance the overall efficiency of the gas turbine combined cycle 100 and the gas turbine fuel production system 50.

Further, according to the gas turbine combined cycle power plant of the present embodiment, the heaters 60, 63 into which low pressure steam and medium pressure steam are respectively introduced are installed at different sites in the vacuum distillation unit 51. It is, thus, possible to use the heaters 60, 63 independently depending on intended applications. To be more specific, the low pressure steam heater 60 into which the low pressure steam is introduced can be used to heat crude oil or heavy oil (a distillation material) supplied to the vacuum distillation unit 51. Further, the medium pressure steam heater 63 into which the medium pressure steam is introduced can be used to heat intermediate fractions (distillation materials) which are extracted by the intermediate stage of the vacuum distillation unit 51.

Further, according to the gas turbine combined cycle power plant of the present embodiment, the low pressure steam heater 60 into which the low pressure steam is introduced is used to preheat crude oil or heavy oil supplied to the vacuum distillation unit 51, by which crude oil or heavy oil can be distilled efficiently inside the vacuum distillation unit 51 to enhance the distillation efficiency in the vacuum distillation unit 51.

Figure 4:
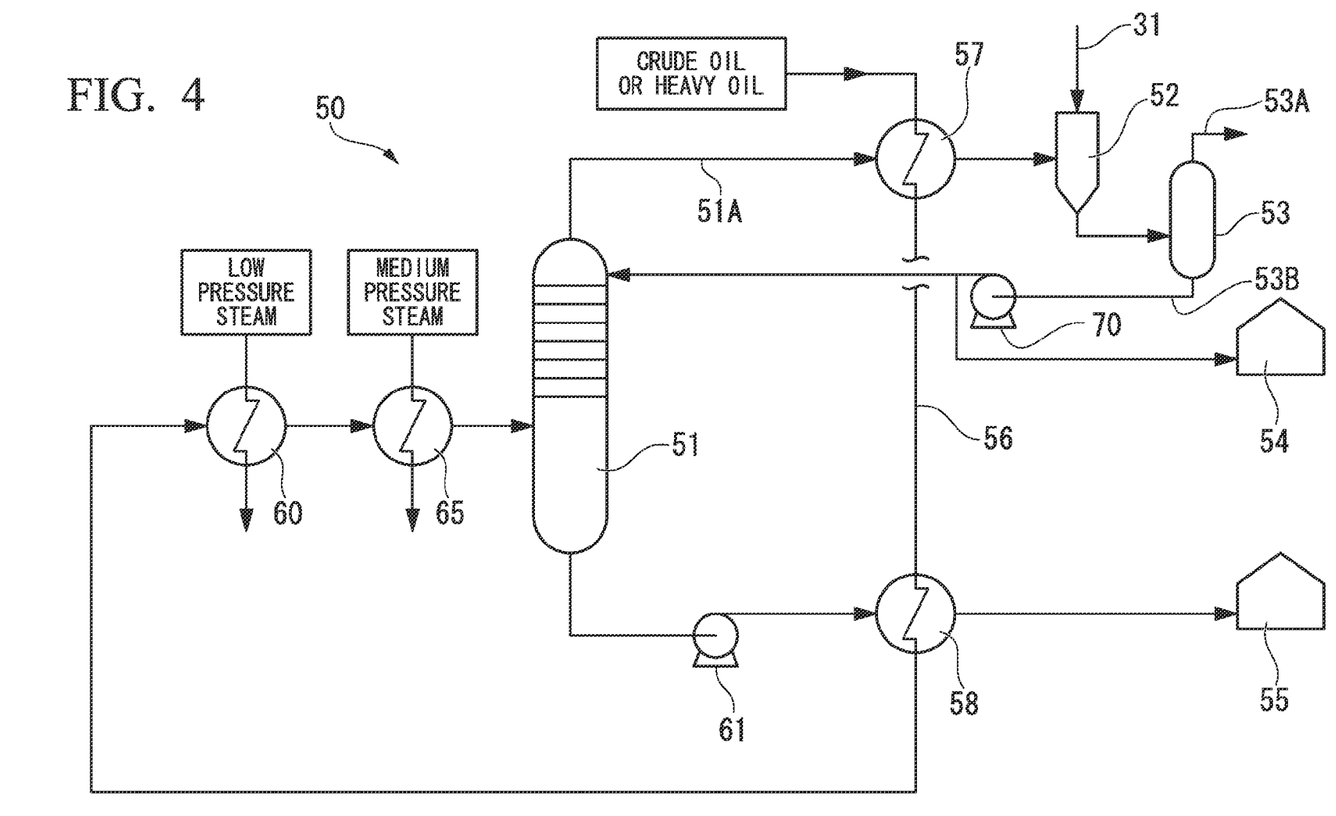
FIG. 4 is a flowchart which shows another mode of the gas turbine fuel production system 50 shown in FIG. 2.

Further, in the above embodiment, the low pressure steam heater 60 into which the low pressure steam is introduced is used to preheat crude oil or heavy oil supplied to the vacuum distillation unit 51. However, as shown in FIG. 4, it is also feasible that the low pressure steam heater 60 into which the low pressure steam is introduced is installed on the fuel supply line 56, thereby crude oil or heavy oil is preheated, and the medium pressure steam heater 65 into which the medium pressure steam is introduced is used to further heat crude oil or heavy oil, which is then supplied to the vacuum distillation unit 51. As compared with a single-stage heating system by using medium pressure steam, the consumption of the medium pressure steam is decreased in the vacuum distillation unit 51 and increased in the gas turbine combined cycle 100. As a result, it is possible to enhance the overall efficiency of the gas turbine combined cycle 100 and the gas turbine fuel production system 50. As compared with the system shown in FIG. 2, the consumption of the medium pressure steam is increased slightly in the system shown in FIG. 4. However, it is almost similar in overall efficiency of the system as a whole, while the system shown in FIG. 4 will not need the intermediate fraction extraction pipe 51C in the example shown in FIG. 2 and can be constituted so as to be modified easily without any change in the vacuum distillation unit 51 in itself.

Further, according to the gas turbine combined cycle power plant of the present embodiment, the medium pressure steam heater 63 into which the medium pressure steam is introduced is used to heat the intermediate fractions extracted by the intermediate stage of the vacuum distillation unit 51, thus making it possible to enhance the distillation efficiency in the vacuum distillation unit 51.

Still further, according to the gas turbine combined cycle power plant of the present embodiment, the intermediate fraction extraction pipe 51C heated by the medium pressure steam heater 63 into which the medium pressure steam is introduced is installed below the fuel supply line 56 heated by the low pressure steam heater 60 into which the low pressure steam is introduced. Thereby, while the heated crude oil or heavy oil moves below inside the vacuum distillation unit 51, the light oil fraction contained therein can be extracted efficiently.

In addition, according to the gas turbine combined cycle power plant of the present embodiment, the low pressure steam and the medium pressure steam extracted from the multiple-stage exhaust heat recovery portion 23 of the gas turbine in the gas turbine combined cycle 100. It is, thereby, possible to effectively use the low pressure steam together with the medium pressure steam.

In the above embodiment, at the multiple-stage exhaust heat recovery portion 23 of the gas turbine combined cycle 100, the medium pressure steam extraction pipe 30 is connected halfway along the medium pressure steam piping 15, and the low pressure steam extraction pipe 31 is also connected halfway along the low pressure steam piping 16. However, the present invention shall not be restricted to a case where the steam extraction pipes 30, 31 are connected halfway along the steam piping 15, 16. Also, as shown in FIG. 3, it is feasible that a medium pressure steam extraction pipe 30' and a low pressure steam extraction pipe 31' are connected respectively halfway along the steam turbines 19, 20 and the low pressure steam and the medium pressure steam extracted through the steam extraction pipes 30', 31'.

Further, in the above embodiment, crude oil or heavy oil supplied through the fuel supply line 56 is heated by the low pressure steam, and the intermediate fractions supplied through the intermediate fraction extraction pipe 51C are also heated by the medium pressure steam. However, the intermediate fractions supplied through the intermediate fraction extraction pipe 51C may be heated by both the low pressure steam and the medium pressure steam. A mode of using the low pressure steam shall not be restricted to the above embodiment.

An explanation has been so far given in detail for the embodiment of the present invention by referring to the drawings. A specific constitution shall not be restricted to the embodiment and includes any change in design and others within a scope not departing from the gist of the present invention.

Industrial Applicability

The present invention is to provide a gas turbine combined cycle power plant which is capable of decreasing the consumption of medium pressure steam and enhancing the overall efficiency of a gas turbine combined cycle and a gas turbine fuel production system, as compared with a single-stage heating system by using medium pressure steam.

DESCRIPTION OF REFERENCE NUMERALS

23: multiple-stage exhaust heat recovery portion
30: medium pressure steam extraction pipe
30': medium pressure steam extraction pipe
31: low pressure steam extraction pipe
31': low pressure steam extraction pipe
50: gas turbine fuel production system
51: vacuum distillation unit
51C: intermediate fraction extraction pipe
60: low pressure steam heater
63: medium pressure steam heater
65: medium pressure steam heater
100: gas turbine combined cycle

The invention claimed is:

1. A gas turbine combined cycle power plant, comprising:
a gas turbine which generates electricity by being fueled with crude oil or heavy oil;
a multiple-stage exhaust heat recovery portion, which generates electricity by using exhaust gas of the gas turbine as at least a partial heat source of the multiple-stage exhaust heat recovery portion; and
a distillation unit,
wherein the multiple-stage exhaust heat recovery portion comprises a low pressure steam generator, a low pressure steam turbine, a medium pressure steam generator, and a medium pressure steam turbine,
wherein the distillation unit distills a light oil fraction from crude oil or heavy oil, with the interior of the distillation unit kept in an environment which lowers a boiling point of crude oil or heavy oil,
wherein the distillation unit is provided with heaters configured to heat crude oil or heavy oil, wherein the heaters are provided with a low pressure steam extraction pipe through which low pressure steam generated in the multiple-stage exhaust heat recovery portion flows and a medium pressure steam extraction pipe through which medium pressure steam generated in the multiple-stage exhaust heat recovery portion flows,
wherein the low pressure steam extraction pipe is branched from and connected to a low pressure steam pipe which supplies the low pressure steam from the low pressure steam generator to the low pressure steam turbine, and
wherein the medium pressure steam extraction pipe is branched from and connected to a medium pressure steam pipe which supplies the medium pressure steam from the medium pressure steam generator to the medium pressure steam turbine.

2. The gas turbine combined cycle power plant according to claim 1,
wherein the heaters comprise heat exchangers.

3. The gas turbine combined cycle power plant according to claim 1,
wherein the heaters into which the low pressure steam and the medium pressure steam are introduced are installed at different sites of the distillation unit.

4. The gas turbine combined cycle power plant according to claim 1,
wherein at least either one of the heaters into which the low pressure steam is introduced or another of the heaters into which the medium pressure steam is introduced is installed halfway along a supply channel which supplies crude oil or heavy oil to the distillation unit, thereby heating crude oil or heavy oil.

5. The gas turbine combined cycle power plant according to claim 1,
wherein one of the heaters into which the medium pressure steam is introduced is installed at a circulation channel which heats intermediate fractions extracted by an intermediate stage of the distillation unit and returns them inside the distillation unit.

6. The gas turbine combined cycle power plant according to claim 1,
wherein one of the heaters into which the medium pressure steam is introduced is used to heat an intermediate fraction extraction pipe and another of the heaters into which the low pressure steam is introduced is used to heat a fuel supply line, and
wherein the intermediate fraction extraction pipe is installed below the fuel supply line.

7. A gas turbine combined cycle power plant, comprising:
a gas turbine which generates electricity by being fueled with crude oil or heavy oil;
a multiple-stage exhaust heat recovery portion, which generates electricity by using exhaust gas of the gas turbine as at least a partial heat source of the multiple-stage exhaust heat recovery portion; and
a distillation unit,
wherein the multiple-stage exhaust heat recovery portion comprises a low pressure steam generator, a low pressure steam turbine, a medium pressure steam generator, and a medium pressure steam turbine,
wherein the distillation unit distills a light oil fraction from crude oil or heavy oil, with the interior of the distillation unit kept in an environment which lowers a boiling point of crude oil or heavy oil,
wherein the distillation unit is provided with heaters configured to heat crude oil or heavy oil, wherein the heaters are provided with a low pressure steam extraction pipe through which low pressure steam generated in the multiple-stage exhaust heat recovery portion flows and a medium pressure steam extraction pipe through which medium pressure steam generated in the multiple-stage exhaust heat recovery portion flows,
wherein the low pressure steam extraction pipe is connected to the low pressure steam turbine, and
wherein the medium pressure steam extraction pipe is connected to the medium pressure steam turbine.

8. The gas turbine combined cycle power plant according to claim 7,
wherein the heaters comprise heat exchangers.

9. The gas turbine combined cycle power plant according to claim 7,
wherein the heaters into which the low pressure steam and the medium pressure steam are introduced are installed at different sites of the distillation unit.

10. The gas turbine combined cycle power plant according to claim 7,
wherein at least either one of the heaters into which the low pressure steam is introduced or another of the heaters into which the medium pressure steam is introduced is installed halfway along a supply channel which supplies crude oil or heavy oil to the distillation unit, thereby heating crude oil or heavy oil.

11. The gas turbine combined cycle power plant according to claim 7,
wherein one of the heaters into which the medium pressure steam is introduced is installed at a circulation channel which heats intermediate fractions extracted by an intermediate stage of the distillation unit and returns them inside the distillation unit.

12. The gas turbine combined cycle power plant according to claim 7,
wherein one of the heaters into which the medium pressure steam is introduced is used to heat an intermediate fraction extraction pipe and another of the heaters into which the low pressure steam is introduced is used to heat a fuel supply line, and
wherein the intermediate fraction extraction pipe is installed below the fuel supply line.

13. A method for generating electricity by a gas turbine combined cycle in which a gas turbine is fueled with crude oil or heavy oil and exhaust gas of the gas turbine is also used at least as a partial heat source of a multiple-stage exhaust heat recovery portion, wherein the multiple-stage exhaust heat recovery portion comprises a low pressure steam generator, a low pressure steam turbine, a medium pressure steam generator, and a medium pressure steam turbine, the method comprising the steps of:
    extracting low pressure steam by a low pressure steam extraction pipe which is branched from and connected to a low pressure steam pipe which supplies the low pressure steam from the low pressure steam generator to the low pressure steam turbine;
    extracting medium pressure steam by a medium pressure steam extraction pipe which is branched from and connected to a medium pressure steam pipe which supplies the medium pressure steam from the medium pressure steam generator to the medium pressure steam turbine; and
    heating the crude oil or the heavy oil by the low pressure steam and the medium pressure steam generated in the multiple-stage exhaust heat recovery portion when a light oil fraction is distilled from crude oil or heavy oil in an environment which lowers a boiling point of crude oil or heavy oil.

14. The method for generating electricity by the gas turbine combined cycle according to claim 13, wherein
    the step of the heating comprises exchanging heat between the low pressure steam and the crude oil or the heavy oil and exchanging heat between the medium pressure steam and the crude oil or the heavy oil.

15. A method for generating electricity by a gas turbine combined cycle in which a gas turbine is fueled with crude oil or heavy oil and exhaust gas of the gas turbine is also used at least as a partial heat source of a multiple-stage exhaust heat recovery portion, wherein the multiple-stage exhaust heat recovery portion comprises a low pressure steam generator, a low pressure steam turbine, a medium pressure steam generator, and a medium pressure steam turbine the method comprising the steps of:
    extracting low pressure steam by a low pressure steam extraction pipe which is connected to the low pressure steam turbine;
    extracting medium pressure steam by a medium pressure steam extraction pipe which is connected to the medium pressure steam turbine; and
    heating the crude oil or the heavy oil by the low pressure steam and the medium pressure steam generated in the multiple-stage exhaust heat recovery portion when a light oil fraction is distilled from crude oil or heavy oil in an environment which lowers a boiling point of crude oil or heavy oil.

16. The method for generating electricity by gas turbine combined cycle according to claim 15, wherein
    the step of the heating comprises exchanging heat between the low pressure steam and the crude oil or the heavy oil and exchanging heat between the medium pressure steam and the crude oil or the heavy oil.

* * * * *